United States Patent
Hattori

(10) Patent No.: US 7,497,892 B2
(45) Date of Patent: Mar. 3, 2009

(54) MAGNETIC PARTICLES, METHOD FOR PRODUCING THE SAME, AND MAGNETIC RECORDING MEDIUM

(75) Inventor: Yasushi Hattori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 441 days.

(21) Appl. No.: 11/238,980

(22) Filed: Sep. 30, 2005

(65) Prior Publication Data

US 2007/0227624 A1     Oct. 4, 2007

(30) Foreign Application Priority Data

Oct. 4, 2004     (JP) .............................. 2004-291256

(51) Int. Cl.
*B22F 9/06* (2006.01)
*B22F 9/30* (2006.01)
*H01F 1/04* (2006.01)

(52) U.S. Cl. ........................... 75/348; 75/349; 148/101; 148/302

(58) Field of Classification Search ....................... None
See application file for complete search history.

(56) References Cited

U.S. PATENT DOCUMENTS

| | | | |
|---|---|---|---|
| 7,201,810 B2 * | 4/2007 | Morimoto et al. ........... | 148/302 |
| 7,264,683 B2 * | 9/2007 | Hasegawa et al. ........... | 148/302 |
| 2002/0153062 A1 * | 10/2002 | Hasegawa et al. ........... | 148/105 |
| 2002/0195172 A1 * | 12/2002 | Arai et al. .................... | 148/121 |
| 2004/0067154 A1 * | 4/2004 | Kanekiyo ..................... | 419/12 |
| 2004/0079446 A1 * | 4/2004 | Kogure et al. ............... | 148/101 |
| 2005/0011588 A1 * | 1/2005 | Hasegawa et al. ........... | 148/302 |
| 2005/0098238 A1 * | 5/2005 | Morimoto et al. ........... | 148/302 |
| 2006/0185766 A1 * | 8/2006 | Sakaki et al. ................ | 148/101 |

FOREIGN PATENT DOCUMENTS

| | | | |
|---|---|---|---|
| JP | A 2001-181754 | | 7/2001 |
| JP | A 2002-050509 | | 2/2002 |
| JP | A 2002-121027 | | 4/2002 |

* cited by examiner

*Primary Examiner*—John P. Sheehan
(74) *Attorney, Agent, or Firm*—Margaret A. Burke; Sheldon J. Moss

(57) ABSTRACT

Magnetic particles of the present invention comprising monocrystals of rare earth element-transition metal-metalloid having particle diameters of 5 nm to 50 nm. The magnetic particles are produced by a producing method comprising a step of fabricating a quenched thin band comprising rare earth element-transition metal-metalloid. A magnetic recording medium of the present invention includes the magnetic layer which contains therein the magnetic particles and the binder, and which is formed on the non-magnetic substrate.

3 Claims, No Drawings

MAGNETIC PARTICLES, METHOD FOR PRODUCING THE SAME, AND MAGNETIC RECORDING MEDIUM

CROSS-REFERENCE TO RELATED APPLICATION

This application claims priority under 35 USC 119 from Japanese Patent Application No. 2004-291256, the disclosure of which is incorporated by reference herein.

BACKGROUND OF THE INVENTION

1. Field of the Invention

The present invention relates to magnetic particles suitable for a magnetic recording medium, a method of producing the same and a magnetic recording medium comprising a magnetic layer that contains the magnetic particles.

2. Description of the Related Art

Reducing particle sizes is essential for enhancing magnetic recording density. For example, when the weight of ferromagnetic body is the same, noise levels are decreased by reducing the particle size in magnetic recording media which are widely used for video tapes, computer tapes and disks.

The reduction in the size of the magnetic particles results in superparamagnetism of the particles due to thermal fluctuations, and the particles cannot be used for a magnetic recording medium. Accordingly, there have been studies on materials such as FePt having a high crystal magnetic anisotropy. However, these magnetic bodies contain platinum and the cost thereof becomes high.

As the magnetic materials having a high crystal magnetic anisotropy comparable to that of FePt magnetic particles, SmCo, NdFeB, SmFeN and the like have been known. However, in order to obtain these materials, in general, thermal treatment of the particles at temperatures of 500° C. or higher is required. When the thermal treatment of the particles is carried out at such high temperatures, the particles are fuse-coalesced to form polycrystals or coarse particles, so that the particles are not suitable for use in magnetic recording media.

The magnetic particles composed of NdFeB are produced in such a manner that a quenched thin band containing NdFeB crystals having a particle size of 5 to 50 nm is formed by a fused metal quenching method, and the quenched thin band is mechanically pulverized. These magnetic particles are used for a bond magnet or the like. The size of the magnetic particles pulverized mechanically is larger of the order of microns and the particles are not suitable for use in magnetic recording media. Further, in the particles, an Nd—Fe phase is segregated at the particle interface of the NdFeB crystals having a particle size of 5 to 50 nm, and there is a drawback that the crystals are susceptible to corrosion.

A method for synthesizing magnetic particles in a liquid phase followed by heating the particles in a hydrogen gas stream to reduce the particles is disclosed, for example, in Japanese Patent Application Laid-Open (JP-A) Nos. 2001-181754, 2002-50509 and 2002-121027. However, by using this method, it is difficult to obtain particles having a homogeneous composition. There is a problem such that the particles tend to be melt-coalesced by heating after nanometer-sized particles are synthesized.

SUMMARY OF THE INVENTION

The present invention was made to solve the above-described problem, and is to provide magnetic particles having an excellent electromagnetic conversion property, a method for producing the particles, and magnetic recording media.

The above-described problem can be solved by the following invention.

A first aspect of the present invention is to provide magnetic particles comprising monocrystals of a rare earth element-transition metal-metalloid having particle diameters of about 5 nm to about 50 nm.

A second aspect of the present invention is to provide magnetic particles according to the first aspect of the present invention, wherein the rare earth element is at least one rare earth element selected from the group consisting of Y, Ce, Pr, Nd, Sm, Gd, Tb, Dy, Ho, Er, Tm and Lu.

A third aspect of the present invention is to provide magnetic particles according to the first aspect of the present invention, wherein the transition metal is at least one transition metal selected from the group consisting of Fe, Ni and Co.

A fourth aspect of the present invention is to provide magnetic particles according to the first aspect of the present invention, wherein the metalloid is at least one metalloid selected from the group consisting of boron, carbon, phosphorus, silicon and aluminum.

A fifth aspect of the present invention is to provide a method of producing magnetic particles, wherein the method comprises forming a quenched thin band comprising a rare earth element-transition metal-metalloid.

A sixth aspect of the present invention is to provide a method of producing magnetic particles according to the fifth aspect of the present invention, wherein forming a quenched thin band comprises forming the quenched thin band by pouring a fused metal composed of a rare earth element-transition metal-metalloid onto a rotating roll.

A seventh aspect of the present invention is to provide a method of producing magnetic particles according to the sixth aspect of the present invention, wherein the method includes a process of subjecting the quenched thin band to a thermal treatment at temperatures of about 400° C. to about 1000° C. to precipitate nanocrystals having a monocrystal state, after the quenched thin band of an amorphous alloy has been formed by pouring the fused metal onto a rotating roll.

An eighth aspect of the present invention is to provide a method of producing magnetic particles according to the seventh aspect of the present invention, wherein the process of quenching the fused metal onto a rotating roll is performed under an inert gas atmosphere.

A ninth aspect of the present invention is to provide a method of producing magnetic particles according to the seventh aspect of the present invention, wherein the method further comprises dissolving and removing an excess rare earth element-transition metal phase by immersing the quenched thin band in an aqueous sodium chloride solution or an aqueous sodium sulfate solution, after the quenched thin band has been formed.

A tenth aspect of the present invention is to provide a method of producing magnetic particles according to the ninth aspect of the present invention, wherein the method further comprises forming a passive-state layer on the surface of the magnetic particles by heating the formed magnetic particles at temperatures of about 40° C. to about 80° C. in the presence of oxygen.

An eleventh aspect of the present invention is to provide a magnetic recording medium having a magnetic layer formed on a non-magnetic substrate, wherein the magnetic layer contains magnetic particles comprising monocrystals of rare earth element-transition metal-metalloid having particle diameters of about 5 nm to about 50 nm, and a binder.

A twelfth aspect of the present invention is to provide a magnetic recording medium according to the eleventh aspect of the present invention, wherein the rare earth element is at least one rare earth element selected from the group consisting of Y, Ce, Pr, Nd, Sm, Gd, Tb, Dy, Ho, Er, Tm and Lu.

A thirteenth aspect of the present invention is to provide a magnetic recording medium according to the eleventh aspect of the present invention, wherein the transition metal is at least one transition metal selected from the group consisting of Fe, Ni and Co.

A fourteenth aspect of the present invention is to provide a magnetic recording medium according to the eleventh aspect of the present invention, wherein the metalloid is at least one metalloid selected from the group consisting of boron, carbon, phosphorus, silicon and aluminum.

A fifteenth aspect of the present invention is to provide a magnetic recording medium according to the eleventh aspect of the present invention, wherein the non-magnetic substrate is at least one of selected from the group consisting of polyesters including polyethylene terephthalate and polyethylene naphthalate, polyolefins. cellulose triacetate, polycarbonate, aromatic polyamides, aliphatic polyamides, polyimides, polyamidoimides, polysulfones, benzoxazoles, aluminum and glass.

A sixteenth aspect of the present invention is to provide a magnetic recording medium according to the eleventh aspect of the present invention, wherein the binder is at least one of binders selected from the group consisting of polymers or copolymers having a monomer unit of vinyl chloride, vinyl acetate, vinyl alcohol, maleic acid, acrylic acid, an acrylate ester, vinylidene chloride, acrylonitrile, methacrylic acid, a methacrylate ester, styrene, butadiene, ethylene, vinyl butyral, vinyl acetal, a vinyl ether; polyurethane resins, rubber resins, phenol resins, epoxy resins, curable polyurethane resins, urea resins, melamine resins, alkyd resins, reactive acrylic resins, formaldehyde resins, silicone resins, epoxy-polyamide resins; a mixture of a polyester resin and an iso-cyanate pre-polymer, a mixture of a polyester polyol and a polyisocyanate, and a mixture of polyurethane and polyisocyanate.

A seventeenth aspect of the present invention is to provide the magnetic recording medium according to the eleventh aspect of the present invention, wherein the magnetic recording medium comprises the non-magnetic substrate having thereon a non-magnetic layer and the magnetic layer in this order.

An eighteenth aspect of the present invention is to provide a magnetic recording medium according to the seventeenth aspect of the present invention, wherein a protective layer is provided on the magnetic layer, the protective layer comprising at least one selected from the group consisting of silica, alumina, titania, zirconia, cobalt oxide, nickel oxide, titanium nitride, silicon nitride and boron nitride; silicon carbide, chromium carbide and boron carbide; carbon including graphite, amorphous carbon and diamond-like carbon.

An nineteenth aspect of the present invention is to provide a magnetic recording medium according to the eighteenth aspect of the present invention, wherein, a lubricant is coated on the protective layer, the lubricant being at least one lubricant selected from the group consisting of carboxylic acids; esters; sulfonic acids; phosphates; alcohols, carboxylic acid amides; amines; and fluorine lubricants.

DETAILED DESCRIPTION OF THE INVENTION

[Magnetic Particles]

Magnetic particles of the present invention comprise monocrystals of rare earth element-transition metal-metal-loid having particle diameters of about 5 nm to about 50 nm.

As the rare earth element, Y, Ce, Pr, Nd, Sm, Gd, Tb, Dy, Ho, Er, Tm and Lu can be used. Among the rare earth elements, Y, Pr, Nd, Gd, Tb, Dy and Ho which have the one axial magnetic anisotropy are preferably used, and. Pr, Nd, Th, Dy which exhibit a high crystal magnetic anisotropy are particularly preferably used. Further, among these elements, Nd can industrially preferably used because of its abundant natural resources. Furthermore, for the purpose of improving the anisotropic magnetic field, a part of Nd can preferably be replaced with Dy or Tb.

Among the transition metals, Fe, Ni and Co are preferably used as they can form a ferromagnetic body. When one of them is used singly, Fe which exhibits the largest crystal magnetic anisotropy and saturation magnetization is preferably used. When Fe is singly used, Curie point is as low as about 310° C., which may result in deterioration of thermal stability. Therefore, a part of Fe may preferably be replaced with Co or Ni.

As the metalloid, boron, carbon, phosphorus, silicon and aluminum are exemplified. Among these elements, boron and aluminum are preferable, and boron is most preferable.

The content of the rare earth element is preferably about 10 to about 15 atomic %, the content of transition metal is preferably about 70 to about 85 atomic %, and the content of the metalloid is preferably about 5 to about 15 atomic % in the magnetic particles.

When a plurality of kinds of metals, for example, Fe, Co and Ni are used as the transition metals, the composition suitable for the magnetic recording medium which has a coercive force of 20,000 e to 60,000 e is expressed by; x=0 to about 45 atomic %, and y=about 25 to about 30 atomic %, or x=about 45 atomic % to about 50 atomic % and y=0 to about 25 atomic %, when the composition is expressed by $Fe_{(100)-x-y}Co_xNi_y$.

In light of reducing corrosiveness, it is further preferable that x=about 0 atomic % to about 45 atomic % and y=about 25 atomic % to about 30 atomic %, or x=about 45 atomic % to about 50 atomic % and y=about 10 atomic % to about 25 atomic %. In light of obtaining an excellent temperature characteristic when a curie point is 500° C. or higher, x=about 20 atomic % to about 45 atomic % and y=about 25 atomic % to about 30 atomic %, or x=about 45 atomic % to about 50 atomic % and y=about 0 atomic % to about 25 atomic %. Accordingly, in view of the coercive force, corrosiveness and temperature characteristic, x=about 20 atomic % to about 45 atomic % and y=about 25 atomic % to about 30 atomic %, or x=about 45 atomic % to about 50 atomic % and y=about 10 atomic % to about 25 atomic %, more preferably, x=about 30 atomic % to about 45 atomic % and y=about 28 atomic % to about 30 atomic %.

The magnetic particles of the present invention do not substantially have a transition metal phase such as a transition metal or a rare earth element-transition metal at the crystal particle interface in the magnetic particles, and form monocrystals comprising a rare earth element-transition metal-metalloid. The magnetic property in the particles can be uniform because the particle is a monocrystal. In order to identify the formation of a monocryatal, an x-ray diffraction can be used.

Further, the particle size (particle diameter) of the magnetic particles must be about 5 nm to about 50 nm, preferably about 5 nm to about 25 nm, more preferably about 5 nm to about 15 nm. When the particle diameter is less than about 5 nm, the particles become superparamagnetic, and when the particle diameter is more than about 50 nm, the SNR (signal to noise ratio) of the particles becomes lower. The particle diameter can be determined by the TEM method.

[Method for Producing Magnetic Particles]

The method for producing magnetic particles includes a step for forming a quenched thin band comprising a rare earth element-transition metal-metalloid.

As a method for obtaining a ferromagnetic body comprising a rare earth-transition metal-boron, there is a method in which starting metal materials are molten in a high frequency furnace followed by casting. However, with this method, a large quantity of transition metals is contained in primary crystals, and it becomes necessary to conduct the solution heat treatment on the transition metal at a temperature just below the melting point of the metals in order to remove an excessive transition metal. By conducting this solution heat treatment, the particle diameter of the magnetic particles becomes larger. Accordingly, with this method, it is difficult to obtain particles having particle diameters of about 5 nm to about 50 nm that is required for the magnetic particles of the present invention.

Accordingly, in the present invention, magnetic particles are produced through the step for forming a quenched thin band comprising a rare earth element-transition metal-metalloid. In this step, a quenching method (fused alloy quenching method) in which a quenched thin band is formed by pouring a fused metal onto a rotating roll is used. In the quenching method, Fe as the primary crystal is not formed, and further, nanocrystals comprising a rare earth-transition metal-metalloid having a monocrystal state and having particle diameters of about 5 nm to about 50 nm in the quenched thin band can be obtained. Moreover, also in the method in which the quenched thin band of an amorphous alloy is formed by pouring a fused metal onto a rotating roll followed by the separation of nanocrystals having monocrystal state due to a thermal treatment of the quenched thin band at temperatures of about 400° C. to about 1000° C., magnetic particles comprising a rare earth-transition metal-metalloid having particle diameters of about 5 nm to about 50 nm can be obtained.

When a fused alloy quenching method is used, the fused metal quenching method is preferably conducted under an inert gas atmosphere. This is conducted for the purpose of preventing oxidization. Specifically, use of He, Ar, $H_2$ or the like is preferable.

In the fused metal quenching method, a cooling rate for the fused metal is determined by a rotational speed of the rotating roll and a thickness of the quenched thin band. When nanocrystals comprising a rare earth-transition metal-metalloid are formed directly after the fused metal has been quenched, the rotational speed of the rotating roll is preferably 10 to 25 m/s. Further, due to the quenching, once an amorphous alloy is obtained, the rotational speed is preferably 25 to 50 m/s.

The thickness of the quenched thin band is preferably about 10 to about 100 μm. In order for the quenched thin band to have this range of the thickness, an amount in which the fused metal is poured is preferably controlled by an orifice or the like.

An excessive rare earth element-transition metal phase can be dissolved and removed by immersing the quenched thin band in an aqueous NaCl solution or an aqueous $Na_2SO_4$ solution, after the quenched thin band has been formed, and accordingly, magnetic particles comprising monocrystals of a rare earth element-transition metal-metalloid can be extracted. Water which is formed by distilled water that is free of oxygen is preferably used for producing aqueous solutions. By this, unpredictable oxidization of aqueous solutions can be prevented. Deoxidization can be performed by using a method in which an inert gas such as Ar or $N_2$ is bubbled or a method in which distilled water is frozen, and thereafter, dissolved.

Concentration of NaCl or $Na_2SO_4$ is preferably about 0.01 to about 1 kmol/m³, and more preferably about 0.05 to about 0.5 kmol/m³.

(Formation of a Passive-State Layer)

In the present invention, it is preferable to form an oxidized layer, i.e., a passive-state layer on the surface of the magnetic particles of the present invention by heating particles in the air. If the heating temperature for particles is excessively low, the processing time is prolonged, and becomes inappropriate from an industrial viewpoint. Meanwhile, if the heating temperature is excessively high, oxidization is reached to the inner portions of the particles, whereby magnetism is deteriorated. Therefore, the heating temperature is preferably about 40° C. to about 80° C., and more preferably about 50° C. to about 70° C. The processing time is preferably about 5 hours to about 10 hours. The thickness of the passive-state layer is preferably about 1 to about 7 nm, more preferably, about 1 to about 5 nm, and most preferably, about 1 to about 2.5 nm.

(Magnetic Recording Medium)

The magnetic recording medium of the present invention is a magnetic recording medium having a magnetic layer formed on a non-magnetic substrate, wherein the magnetic layer contains therein the above-described magnetic particles and a binder of the present invention.

Specific examples of the layer structure include a structure in which a non-magnetic layer and a magnetic layer which are sequentially formed on a non-magnetic substrate, and a structure in which a backing layer or an undercoat layer is added to the aforementioned structure if necessary. Further, each layer such as a non-magnetic substrate or a magnetic layer will be explained hereinafter.

(Non-Magnetic Substrate)

Although the non-magnetic substrate which is used for the present invention (hereinafter, sometimes, simply referred to as "substrate") is not particularly limited, it is preferable to use the one which is substantially non-magnetic and flexible.

As a flexible substrate, known films such as polyesters such as polyethylene terephthalate and polyethylene naphthalate, polyolefins, cellulose triacetate, polycarbonate, aromatic polyamides, aliphatic polyamides, polyimides, polyamidoimides, polysulfones, and polybenzoxazoles can be used. Use of high strength substrate such as polyethylenenaphthalate or polyamide is preferable.

If necessary, a laminate type substrate as disclosed in JP-A No. 03-224127 may be used to change the surface roughness of the substrate surface on which the magnetic layer or the back layer will be formed. Any of these substrates may be subjected to corona discharge treatment, plasma treatment, adhesion-facilitating treatment, heat treatment, dust-removing treatment, or the like, in advance. Furthermore, as the substrate of the magnetic recording medium of the present invention, it is also possible to use an aluminum or glass substrate.

The center plane average surface roughness (Ra) of the substrate measured by the use of TOPO-3D manufactured by WYKO Corporation is generally preferably about 8.0 nm or less, more preferably about 4.0 nm or less, still more preferably about 2.0 nm or less. It is preferred that the substrate does not only have a low center plane average surface roughness, but also is free from a coarse projection of about 0.5 μm or higher.

The surface roughness configuration may be freely controlled by the size and amount of a filler which is added to the substrate as needed. Examples of such a filler include fine particles of an inorganic material such as an oxide or carbonate of Ca, Si, Ti, or the like, and a fine organic powder of acrylic resin or the like. Preferably, the substrate is about 1 μm or less in maximum height of projections (Rmax), about 0.5 μm or less in ten point height of projections (Rz), about 0.5 μm or less in center plane top height (Rp), about 0.5 μm or less in center plane valley depth (Rv), from about 10% to about 90% in center plane area rate (Sr), and from about 5 to about 300 μm in average wavelength (λa).

In order to obtain a desired electromagnetic conversion characteristic and durability, the distribution of the surface projections of the substrate may be freely controlled using the filler, which may be controlled in the range from about 0.01 μm to about 1 μm in size and in the range from 0 to about 2000 per 0.1 mm$^2$ in the number of particles.

The F-5 value (value of stress at 5% elongation) of the substrate is preferably from 5 to 50 kg/mm$^2$ (49 to 490 MPa). The substrate preferably shows a thermal contraction rate of about 3% or less, more preferably of about 1.5% or less when heated at 100° C. for 30 minutes, and preferably shows a thermal contraction rate of about 1% or less, more preferably of about 0.5% or less when heated at 80° C. for 30 minutes.

Preferably, the substrate has a breaking strength of about 5 to about 100 kg/mm$^2$ (49 to 980 MPa), an elastic modulus of about 100 to about 2000 kg/mm$^2$ (0.98 to 19.6 GPa), a thermal expansion coefficient of about $10^{-8}$ to about $10^{-4}$/° C., more preferably of about $10^{-6}$ to about $10^{-5}$/° C., and a humidity expansion coefficient of about $10^{-4}$/RH % or less, more preferably about $10^{-5}$/RH % or less. In a preferred mode, the differences of each of the thermal characteristic, the size characteristic, and the mechanical strength characteristic in all plane directions of the substrate are substantially within the range of 10% or less.

The substrate preferably has a thickness of about 2 to about 100 μm, more preferably of about 2 to about 80 μm. In the case that the magnetic recording medium of the invention is a computer tape, the substrate preferably has a thickness of about 3.0 to about 6.5 μm, more preferably of about 3.0 to about 6.0 μm, and still more preferably of about 4.0 to about 5.5 μm. (Magnetic Layer)

The magnetic layer contains the magnetic particles of the above-described magnetic particles of the invention, the binder, and optionally contains any of various additives.

Magnetic recording medium of the invention may have the above-described magnetic layer on one surface or both surfaces of the substrate. A non-magnetic layer may be provided between the substrate and the magnetic layer in order to provide a lubricant source and cover the projections of the surface of the substrate.

(Binder)

The binder may be a conventionally known thermoplastic resin, thermosetting resin or a known reactive resin or any combination thereof.

In a preferred mode, the thermoplastic resin has a glass transition temperature of about −100 to about 150° C., a number average molecular weight of about 1,000 to about 200,000 (more preferably of about 10,000 to about 100,000) and a polymerization degree of about 50 to about 1000.

Examples of such a thermoplastic resin include polymers or copolymers comprising a monomer unit of vinyl chloride, vinyl acetate, vinyl alcohol, maleic acid, acrylic acid, an acrylate ester, vinylidene chloride, acrylonitrile, methacrylic acid, a methacrylate ester, styrene, butadiene, ethylene, vinyl butyral, vinyl acetal, a vinyl ether, or the like; and polyurethane resins and various rubber resins.

Examples of the thermosetting resin and the reactive resin include phenol resins, epoxy resins, curable polyurethane resins, urea resins, melamine resins, alkyd resins, reactive acrylic resins, formaldehyde resins, silicone resins, epoxypolyamide resins, a mixture of a polyester resin and an isocyanate pre-polymer, a mixture of a polyester polyol and a polyisocyanate, and a mixture of polyurethane and polyisocyanate.

These resins are described in detail in the text "Plastic Handbook," published by Asakura Publishing Company Ltd. Any known electron beam-curable resin may also be used for each layer. Examples of such a resin and a method of producing the same are described in detail in JP-A No. 62-256219.

One or more of the above resins may be used alone or in combination. Preferable examples thereof include a combination of a polyurethane resin and at least one selected from a vinyl chloride resin, a vinyl chloride-vinyl acetate copolymer, a vinyl chloride-vinyl acetate-vinyl alcohol copolymer, and a vinyl chloride-vinyl acetate-maleic anhydride copolymer; or a combination of any of the above copolymers and polyisocyanate.

The structure of the polyurethane resin may comprise known polyester-polyurethane, polyether-polyurethane, polyether-polyester-polyurethane, polycarbonate-polyurethane, polyester-polycarbonate-polyurethane, polycaprolactone-polyurethane, or the like.

In order to have better dispersibility and durability, any of the above binders may preferably have at least one polar group selected from —COOM, —SO$_3$M, —OSO$_3$M, —P=O(OM)$_2$, —O—P=O(OM)$_2$ (wherein M represents a hydrogen atom or an alkali metal base), OH, NR$_2$, N$^+$R$_3$ (wherein R represents a hydrocarbon group), an epoxy group, SH, and CN, wherein the polar group is introduced by copolymerization or addition reaction. The amount of such a polar group is preferably from $10^{-8}$ to $10^{-1}$ mol/g, more preferably from about $10^{-6}$ to about $10^{-2}$ mol/g.

Specific examples (by product name) of the binder for use in the invention include VAGH, VYHH, VMCH, VAGF, VAGD, VROH, VYES, VYNC, VMCC, XYHL, XYSG, PKHH, PKHJ, PKHC, and PKFE (each manufactured by Union Carbide Corporation), MPR-TA, MPR-TA5, MPR-TAL, MPR-TSN, MPR-TMF, MPR-TS, MPR-TM, and MPR-TAO (each manufactured by Nisshin Chemical Industry Co., Ltd.), 1000W, DX80, DX81, DX82, DX83, and 100FD (each manufactured by DENKI KAGAKU KOGYO KABUSHIKI KAISHA), MR-104, MR-105, MR110, MR100, MR555, and 400X-110A (each manufactured by ZEON CORPORATION), Nippollan N2301, N2302 and N2304 (each manufactured by NIPPON POLYURETHANE INDUSTRY CO., LTD.), Pandex T-5105, T-R3080 and T-5201, Burnock D-400 and D-210-80 and Crisvon 6109 and 7209 (each manufactured by DAINIPPON INK AND CHEMICALS, INCORPORATED), Vylon UR8200, UR8300, UR8700, RV530, and RV280 (each manufactured by TOYOBO CO., LTD.), Daiferamine 4020, 5020, 5100, 5300, 9020, 9022, and 7020 (each manufactured by Dainichiseika Color & Chemicals Mfg. Co., Ltd.), MX 5004 (trade name, manufactured by MITSUBISHI CHEMICAL CORPORATION), Sanprene SP-150 (trade name, manufactured by SANYO KASEI Co., Ltd.), and Saran F310 and F210 (trade name, manufactured by Asahi Kasei Corporation).

Binders used for the non-magnetic layer and the magnetic layer of the present invention are used in an amount of about 5 to about 50% by mass, and preferably in an amount of about 10 to about 30% by mass, with respect to the total mass of non-magnetic powder in the non-magnetic layer or that of ferromagnetic metal powder (magnetic particles) in the magnetic layer.

When a vinyl chloride resin is used, the vinyl chloride is used in an amount of about 5 to about 30% by mass, and when a polyurethane resin is used, the polyurethane resin is used in an amount of about 2 to about 20% by mass, and when polyisocyanate is used, the polyurethane resin is used in an amount of about 2 to about 20% by mass, and they may preferably be used in combination. However, in a case where head corrosion may occur due to a very small amount of chlorine by dechlorination from the resin, for example, only the polyurethane resin or only a combination of the polyurethane resin and the polyisocyanate may be used.

When the polyurethane resin is used, it preferably has a glass transition temperature of -about 50 to about 150° C., more preferably of about 0 to about 100° C., a breaking elongation of about 100 to about 2000%, a breaking stress of about 0.05 to about 10 kg/mm$^2$ (0.49 to 98 MPa), and a yield point of about 0.05 to about 10 kg/mm$^2$ (0.49 to 98 MPa). According to the invention, the magnetic layer of the magnetic recording medium may be formed of two or more layers as long as the requirements of the invention are satisfied. Similarly, the non-magnetic layer may be formed of two or more layers. Furthermore, an arbitrary layer, which has various functions, can be provided. If desired, therefore, the amount of the binder, the amount of the vinyl chloride resin, the polyurethane resin, the polyisocyanate, or any other resin contained in the binder, the molecular weight of each resin, the amount of the polar group, or the physical properties of any of the above resins may be changed for the magnetic layer, an undercoat layer and the like, or rather, the layers should be optimized in terms of those amounts or characteristics, respectively, and any known technique for the magnetic multilayer may be used.

When the amount of a binder is changed for each layer, in order to improve head touch for a head, a method in which the amount of the binder in the nonmagnetic layer can be increased to have flexibility or the like is exemplified.

Examples of the polyisocyanate include isocyanates such as tolylene diisocyanate, 4,4'-diphenylmethane diisocyanate, hexamethylene diisocyanate, xylylene diisocyanate, naphthylene-1,5-diisoyanate, o-toluidine diisocyanate, isophorone diisocyanate, and triphenylmethane triisocyanate; reaction products of any of these isocyanates and a polyalcohol; and polyisocyanates formed by the condensation reaction of an isocyanate.

These isocyanates are commercially available under the trade names of Coronate L, Coronate HL, Coronate 2030, Coronate 2031, Millionate MR, and Millionate MTL (trade name, manufactured by NIPPON POLYURETHANE INDUSTRY CO., LTD.), Takenate D-102, Takenate D-110N, Takenate D-200, and Takenate D-202 (trade name, manufactured by TAKEDA CHEMICAL INDUSTRIES, LTD.), and Desmodur L, Desmodur IL, Desmodur N, and Desmodur HL (trade name, manufactured by Bayer Chemicals Japan Ltd.), and these can be used singly or two or more thereof can be used in combination by making use of differences in curing reactivity.

In the case in which the non-magnetic layer is formed on the substrate, the non-magnetic layer is formed by coating, and thereafter, the magnetic layer (also referred to as an "upper layer" or an "upper magnetic layer") may be formed while the nonmagnetic layer is in a wet state (W/W) or after the non-magnetic layer is dried (W/D). In terms of production efficiency, it is preferable to use a simultaneous or sequential wet-state coating. In the case of a disk, however, the coating after drying can be used sufficiently. In addition, the non-magnetic layer will be described later.

Since the non-magnetic layer and the magnetic layer are laminated to each other so as to have a multilayered structure (the non-magnetic layer and the magnetic layer), both layers may be formed simultaneously, or the non-magnetic layer and the magnetic layer may be formed at the same time through the sequential wet-state coating process (W/W). Thus, a surface treatment process such as a calendering process can effectively be used, so that the surface roughness of the upper magnetic layer can be improved even if it is very thin. Hereinafter, a detailed description of the method for forming the magnetic layer and the non-magnetic layer will be made.

First, in preparing the coating liquid for the magnetic layer (magnetic liquid for the magnetic layer) or the coating liquid for the non-magnetic layer (non-magnetic liquid for the non-magnetic layer), a kneading process using an open kneader, continuous kneader, pressurized kneader, extruder, or the like can be conducted to dissolve dispersants in the coating liquid. Dispersion media such as glass beads, zirconia beads, titania beads, steel beads, and the like may be used to disperse magnetic particles and nonmagnetic powder in the coating liquid.

Various additives in addition to the magnetic particle and the above-described binder of the present invention are contained in the magnetic liquid for the magnetic layer as needed. The content of the magnetic particle in the magnetic liquid for the magnetic layer is preferably about 3% by mass to about 50% by mass.

Then, a magnetic layer may be formed by applying a magnetic liquid for the magnetic layer onto a substrate by a known method. Here, if a magnetic recording medium has a multilayered structure for forming the nonmagnetic layer and the magnetic layer, use of the following methods is preferable:

In a first method, a nonmagnetic layer is first coated by using a commonly used gravure coating, roll coating, blade coating, extrusion coating, or other apparatus, and then a magnetic layer is coated while the nonmagnetic layer is still wet, by coating the magnetic liquid for the magnetic layers using the substrate pressurized extrusion coating apparatus disclosed in Japanese Patent Application Publication (JP-B) No. 1-46186, JP-A No. 60-238179, and JP-A No. 2-265672.

In a second method, a nonmagnetic liquid for the nonmagnetic layer and a magnetic liquid for the magnetic layer are applied almost simultaneously through a coating head having two coating liquid-communicating slits as disclosed in JP-A Nos. 63-88080, 2-17971, and 2-265672.

In a third method, a nonmagnetic liquid for the nonmagnetic layer and a magnetic liquid for the magnetic layer are applied almost simultaneously by using an extrusion coating apparatus equipped with a backup roll as disclosed in JP-A No. 174965.

It is desirable to apply a shear force to the coating liquid within the coating head by the methods as disclosed in JP-A Nos. 62-95174 and 1-236968, in order to prevent deterioration of the magnetic conversion performance or the like of the magnetic recording medium due to aggregation of magnetic particles. In addition, as for viscosities of the coating liquids for magnetic and nonmagnetic layers, it is preferable that the viscosity values are within the numerical range disclosed in JP-A No. 3-8471. In order to realize the multilayered structure, a sequential multilayer-coating in which a nonmagnetic layer is first applied and dried, and then a magnetic layer is formed thereon can be conducted. However, use of the simultaneous multilayer-coating described above is preferable in order to minimize coating defects and improve qualities while preventing defects such as dropout.

Particularly in the case of a magnetic disk, although it is sometimes possible to obtain sufficiently isotropic orientation even with non-orientation, without using an orientation device, it is more preferable to use a known random orientation device, wherein cobalt magnets are arranged diagonally and alternately or an AC magnetic field is applied by solenoids. In the case of ferromagnetic metal powder, especially when high-density recording is carried out, it is preferable that the isotropic orientation is a vertical orientation. Further, circumferential orientation using a spin coater can be used.

In the case of magnetic tapes, magnetic powder is oriented in the longitudinal direction by using cobalt magnets and solenoids. It is preferable to make it possible to control the drying position of coated film by controlling the temperature of drying air, flow rate, and coating speed, and the coating speed is preferably about 20 to about 1000 m/min and the temperature of drying air is preferably 60° C. or more. The coated film may be preliminary dried suitably before it is sent into the magnet zone.

After the application and drying above, the magnetic recording medium may be additionally calendered if needed. Heat-resistant plastic rolls such as those of epoxy, polyimide, polyamide, polyimide amide resin, or the like or metal rolls are used as the calendering rolls, and in particular, if magnetic layers are formed on both surfaces of the substrate, processing by using only metal rolls is preferable. The processing temperature is preferably about 50° C. or more and more preferably about 100° C. or more.

The linear pressure is preferably about 200 kg/cm (196 kN/m) or more and still more preferably about 300 kg/cm (294 kN/m) or more.

The thickness of the magnetic layer is preferably from about 0.005 μm to about 0.20 μm, and more preferably from about 0.05 μm to about 0.15 μm. If the thickness of the magnetic layer is in a range of about 0.005 μm to about 0.20 μm, reduction of reproduction power, deterioration of overwriting characteristics, and resolution can be prevented.

(Carbon Black and Abrasive Material)

It is preferable that the magnetic layer contains carbon black. Examples of the carbon black include furnace black for rubber, thermal black for rubber, black for coloring, and acetylene black.

The carbon black preferably has an SBET of about 5 to about 500 m$^2$/g, a DBP oil absorption of about 10 to about 400 ml/100 g, an average particle diameter of about 5 to about 300 nm, more preferably of about 10 to about 250 nm, still more preferably of about 20 to about 200 nm, a pH of about 2 to about 10, a water content of 0. about 1 to about 10%, and a tap density of about 0.1 to about 1.0 g/ml.

Specific examples of the carbon black include BLACK-PEARLS-2000, 1300, 1000, 900, 905, 800, and 700, and VULCAN XC-72 (each manufactured by Cabot Corporation), #80, #60, #55, #50, and #35 (each manufactured by Asahi Carbon Co., Ltd.), #2400B, #2300, #900, #1000, #30, #40, and #10B (each manufactured by Mitsubishi Chemical Co., Ltd.), and CONDUCTEX SC, RAVEN 150, 50, 40, and 15, and RAVEN-MT-P (each manufactured by Columbian Chemicals Company), and Ketjenblack EC (trade name, manufactured by Japan EC Company).

The carbon black may be subjected to a surface treatment with a dispersing agent or the like or subjected to grafting with a resin, and used. The carbon black having a portion converted into graphite can be used. The carbon black may be previously dispersed in a binder before it is added to a magnetic coating.

These carbon blacks can be used alone or in combination. The carbon black is preferably used in an amount of about 0.1 to about 30% based on the total mass of the magnetic material (magnetic particles). The carbon black has the function of preventing static electrification of the magnetic layer, reducing the coefficient of friction, imparting light-shielding properties, or improving the film strength, depending on its type. Therefore, of course, the upper magnetic layer and the lower non-magnetic layer may differ in the type, amount, or combination of the carbon black(s) in the invention, and the carbon blacks may properly be used depending on purpose in view of the above-described characteristics such as the particle size, the oil absorption, the electrical conductivity, and pH. The carbon black should rather be optimized in each layer. For example, the text "Carbon Black Handbook" (edited by the Carbon Black Association of Japan) may be referred to, regarding the carbon black for use in the magnetic layer according to the invention.

The magnetic layer also preferably contains an abrasive material. The abrasive material may be mainly any one or any combination of known materials with a Mohs' hardness of 6 or more, such as α-alumina whose α a ratio is 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. Any complex of these abrasive materials (in which one abrasive is surface-treated with another abrasive) may also be used. In some cases, the abrasive material contains any other compound or element in addition to the main component. If the content of the main component is about 90% by mass or more in such cases, however, the effect should be the same.

The particle size of the abrasive material is preferably about 0.01 to about 2 μm, more preferably about 0.05 to about 1.0 μm, and still more preferably about 0.05 to about 0.5 μm.

The particle size distribution should preferably be narrow for improvement in electromagnetic conversion characteristics. For the purpose of improving the durability, abrasive materials different in particle size may be used in combination as needed, or a single abrasive material having a wide particle size distribution may be used for the same effect. Preferably, the abrasive material has a tap density of about 0.3 to about 2 g/ml, a water content of about 0.1 to about 5%, a pH of about 2 to about 11, and a SBET of about 1 to about 30 m$^2$/g. The shape of the abrasive material may be any of a needle, a sphere and a cube, and preferably has a sharp edge part for high abrasive properties.

Specific examples thereof include AKP-12, AKP-15, AKP-20, AKP-30, AKP-50, HIT20, HIT-30, HIT-55, HIT60A, HIT70, HIT80, and HIT100 (each manufactured by Sumitomo Chemical Co., Ltd.), ERC-DBM, HP-DBM and HPS-DBM (each manufactured by Reynolds Corporation), WA10000 (trade name, manufactured by Fujimi Kenmazai Corporation), UB20 (trade name, manufactured by Uyemura & Co., Ltd.), G-5, Kromex U2 and Kromex U1 (each manufactured by Nippon Chemical Industrial Co., Ltd.), TF100 and TF140 (each manufactured by TODA KOGYO CORP.), beta-Random Ultrafine (trade name, manufactured by IBIDEN CO., LTD.), and B-3 (trade name, manufactured by Showa Mining Co., Ltd.). If desired, any of these abrasive materials may be added to the non-magnetic layer, so that the shape of the surface or the state of the abrasive material projection can be controlled. Of course, the particle diameter and amount of the abrasive material to be added to the magnetic layer or the non-magnetic layer should each be set at an optimal value.

(Additives)

The magnetic layer and the non-magnetic layer as described below preferably contain any of various additives. The additives having at least one effect of a lubricating effect, an antistatic effect, a dispersing effect, a plastic effect and the like are appropriately used.

Examples thereof include molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, an alkyl phosphate and an alkali metal salt thereof, an alkyl sulfate and an alkali metal salt thereof, polyphenyl ether, phenyl phosphonic acid, α-naphthyl phosphoric acid, phenyl phosphoric acid, diphenyl phosphoric acid, p-ethylbenzene phosphonic acid, phenyl phosphinic acid, aminoquinones, various silane coupling agents, titanium coupling agents, a fluorine-containing alkyl sulfate and an alkali metal salt thereof, a monobasic fatty acid of 10 to 24 carbon atoms (which may have an unsaturated bond or may be branched) and a metal salt thereof (with Li, Na, K, Cu, or the like), a mono-, di-, tri-, tetra-, penta-, or hexa-hydric alcohol of 12 to 22 carbon atoms (which may have an unsaturated bond or may be branched), an alkoxy alcohol of 12 to 22 carbon atoms, a mono-, di- or tri-fatty acid ester comprising a monobasic fatty acid of 10 to 24 carbon atoms (which may have an unsaturated bond or may be branched) and any one of mono-, di-, tri-, tetra-, penta-, and hexa-hydric alcohols of 2 to 12 carbon atoms (which may have an unsaturated bond or may be branched), a fatty acid ester of a monoalkyl ether of an alkylene oxide polymer, a fatty acid amide of 8 to 22 carbon atoms, and an aliphatic amine of 8 to 22 carbon atoms.

Specific examples of the fatty acid include capric acid, caprylic acid, lauric acid, myristic acid, palmitic acid, stearic acid, behenic acid, oleic acid, elaidic acid, linolic acid, linolenic acid, and isostearic acid. Specific examples of the ester include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl. Specific examples of the alcohol include oleyl alcohol, stearyl alcohol and lauryl alcohol.

Examples of the applicable additive also include a nonionic surfactant such as an alkylene oxide type, a glycerol type, a glycidol type, and an alkylphenol-ethylene oxide adduct; a cationic surfactant such as a cyclic amine, an ester amide, a quaternary ammonium salt, a hydantoin derivative, a heterocyclic compound, a phosphonium compound, or a sulfonium compound; an anionic surfactant having an acidic group such as a carboxylic acid, a sulfonic acid, a phosphoric acid, a sulfate ester group, and a phosphate ester group; and an amphoteric surfactant such as an amino acid, an aminosulfonic acid, a sulfate or phosphate ester of an amino alcohol, and an alkyl betaine type.

Such surfactants are described in detail in the text "Surfactant Handbook" (published by Sangyo Tosho Publishing). The lubricant, the antistatic agent or the like does not have to be 100% pure and may contain impurities such as an isomer, an unreacted material, a byproduct, a decomposed product, and an oxide, besides the main component. The content of such impurities is preferably 30% by mass or less, and more preferably 10% by mass or less.

These lubricants and surfactants have different physical actions, respectively, and the type and amount of the lubricant or the surfactant and the mixing ratio of the lubricant and the surfactant for producing a synergistic effect should be optimized depending on purposes. Examples of such a purpose include, but of course are not limited to, (1) control of exudation from the surface by using a fatty acid, in the non-magnetic layer, whose melting point is different from the melting point a fatty acid in the magnetic layer, (2) control of exudation from the surface by using esters different in boiling point, melting point or polarity, (3) improvement in application stability by controlling the amount of the surfactant, and (4) improvement in the lubricating effect by increasing the amount of the lubricant added to an intermediate layer. In general, the total amount of the lubricant with respect to the amount of the magnetic material (magnetic particles) or the non-magnetic powder is preferably from about 0.1 to about 50% by mass, and more preferably from about 2 to about 25% by mass.

All or a part of the additives used in the invention may be added in any step of the magnetic coating-manufacturing process and the non-magnetic coating-manufacturing process. For example, the additives may be mixed with the magnetic material before the kneading step, may be added in the step of kneading the magnetic material, the binder and the solvent, may be added in the dispersing step, may be added after the dispersing step, or may be added immediately before the application.

In some cases, after the magnetic layer is applied according to the purpose, a part or all of the additives may be applied simultaneously or sequentially so that the purpose can be achieved. According to the purpose, after the calender treatment has been conducted or after slitting has been completed, a lubricant may be applied to the surface of the magnetic layer.

(Non-Magnetic Layer)

Details for the non-magnetic layer will be explained next. The structure of the non-magnetic layer should not be limited as long as it is substantially non-magnetic. In general, examples of the non-magnetic layer comprise at least a resin and powder such as inorganic powder or organic powder is preferably dispersed in the resin. Although the inorganic powder is preferably non-magnetic powder, magnetic powder can be used as long as the non-magnetic layer is substantially non-magnetic.

The particle size (particle diameter) of the non-magnetic powder is preferably in the range of about 0.005 to about 2 μm. However, the non-magnetic powder having different particle sizes can be used in combination as needed, or even when single non-magnetic powder is used, the same effect can be exhibited by providing the single non-magnetic powder with a wider particle size distribution. Above all, a preferable particle size of the non-magnetic powder is in the range of about 0.01 μm to about 0.2 μm. In particular, when the non-magnetic powder is a granular metal oxide, an average particle diameter of the non-magnetic powder is preferably about 0.08 μm or less. When the nonmagnetic powder is a needle-shaped metal oxide, the length of a major axis is preferably about 0.3 μm or less, and more preferably about 0.2 μm or less. A tap density of the non-magnetic powder is preferably about 0.05 to about 2 g/ml, and more preferably about 0.2 to about 1.5 g/ml. A water content in the non-magnetic powder is preferably about 0.1 to about 5% by mass, more preferably of about 0.2 to about 3% by mass, and still more preferably about 0.3 to about 1.5% by mass. The pH value of the non-magnetic powder is preferably about 2 to about 11, and particularly preferably of about 5.5 to about 10.

The SBET (specific surface area) of the non-magnetic powder is preferably about 1 to about 100 m$^2$/g, more preferably about 5 to about 80 m$^2$/g, and still more preferably about 10 to about 70 m$^2$/g. A crystallite size (crystal diameter) of the non-magnetic powder is preferably about 0.004 μm to about 1 μm, and more preferably about 0.04 μm to about 0.1 μm.

The oil absorption amount of the non-magnetic powder using DBP (dibutyl phthalate) is preferably about 5 to about 100 ml/100 g, more preferably about 10 to about 80 ml/100 g, and still more preferably about 20 to about 60 ml/100 g. The specific gravity of the non-magnetic powder is preferably about 1 to about 12, and more preferably about 3 to about 6. The non-magnetic powder can be formed into any configuration selected from the group consisting of needle, spherical, polyhedral, and tabular shapes. Mohs' hardness of the non-magnetic powder is preferably about 4 to about 10. The SA (stearic acid) absorption amount of the non-magnetic powder is preferably about 1 to about 20 μmol/m$^2$, more preferably about 2 to about 15 μmol/m$^2$, and still more preferably about 3 to about 8 μmol/m$^2$. The pH value of the non-magnetic powder is preferably between about 3 and about 6.

Examples of the non-magnetic powder may be selected from the group of inorganic compounds such as metal oxide, metal carbonate, metal sulfate, metal nitride, metal carbide, and metal sulfide.

Examples of the inorganic compounds include α-alumina with an α-component proportion of 90% or more, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide, and these may be used alone or in combination. In view of a narrow particle-size distribution, a wide variety of function-imparting means or the like, use of titanium dioxide, zinc oxide, iron oxide or barium sulfate is particularly preferable, and use of titanium dioxide or α-iron oxide is most preferable.

Specific examples (product names) of the non-magnetic powder include NANOTITE (manufactured by SHOWA DENKO K.K.), HIT-100 and ZA-G1 (manufactured by Sumitomo Chemical Co., Ltd.), α-hematite DPN-250, DPN-250BX, DPN-245, DPN-270BX, DPN-500BX, DBN-SA1, and DBN-SA3 (manufactured by TODA KOGYO CORP.), titanium oxide TTO-51B, TTO-55A, TTO-55B, TTO-55C, TTO-55S, TTO-55D, SN-100, α-hematite E270, E271, E300, and E303 (manufactured by ISHIHARA SANGYO KAISHA LTD.), titanium oxide STT-4D, STT-30D, STT-30, and STT-65C, and α-hematite α-40 (manufactured by TITAN KOGYO KABUSHIKI KAISHA), MT-100S, MT-100T, MT-150W, MT-500B, MT600B, MT-100F, and MT-500HD (manufactured by Tayca Corporation), FINEX-25, BF-1, BF-10, BF-20, and ST-M (manufactured by SAKAI CHEMICAL INDUSTRY CO., LTD.), DEFIC-Y and DEFIC-R (manufactured by Dowa Mining Co., Ltd.), AS2BM and TiO2P25 (manufactured by Nippon Aerosil Co., Ltd.), and 100A and 500A (manufactured by UBE INDUSTRIES, LTD.). Particularly preferable non-magnetic powders are titanium dioxide powder and non-magnetic α-iron oxide powder.

By conducting a surface treatment on the surface of the non-magnetic powder, it is preferable that any one of $Al_2O_3$, $SiO_2$, $TiO_2$, $ZrO_2$, $SnO_2$, $Sb_2O_3$, ZnO, and $Y_2O_3$ is present on the surface of the non-magnetic powder. In light of dispersibility, use of $Al_2O_3$, $SiO_2$, $TiO_2$, or $ZrO_2$ is preferable, and use of $Al_2O_3$, $SiO_2$ or $ZrO_2$ is more preferable. These can be used alone or in combination. In accordance with the purpose, a surface treatment layer which has been coprecipitated can be used or a method in which alumina is made to exist first, and then the surface layer is treated with silica or a method having an opposite manner to this method can be used. Although the surface treatment layer may be a porous layer in accordance with the purpose, generally, a homogeneous and dense surface treatment layer is more preferable.

When a surface electric resistance Rs of the non-magnetic layer is decreased by mixing carbon-black with the non-magnetic layer, the light transmittance can be reduced to obtain the desired micro-Vickers hardness. By allowing to contain carbon black in the non-magnetic layer, it becomes possible to exhibit a lubricant-storing effect. As types of carbon blacks, furnace black for rubber, thermal black for rubber, black for coloring, acetylene black, and the like can be used. In accordance with the desired effect, the characteristics as described below of carbon blacks in the non-magnetic layer must be optimized. When used together, more effects can be provided by the carbon blacks having the optimized characteristics.

The SBET of carbon black in the nonmagnetic layer is preferably about 100 to about 500 m$^2$/g, and more preferably about 150 to about 400 m$^2$/g. The DBP oil absorption of carbon black in the non-magnetic layer is preferably about 20 to about 400 ml/100 g, and more preferably of about 30 to about 400 ml/100 g. The particle diameter of carbon black is about 5 nm to about 80 nm, more preferably about 10 to about 50 nm, and still more preferably about 10 to about 40 nm. The pH value of carbon black is preferably about 2 to about 10, the water content thereof is preferably about 0.1 to about 10%, and the tap density thereof is preferably about 0.1 to about 1 g/ml.

Specific examples (by product name) of carbon blacks for use in the invention include BLACKPEARLS 2000, 1300, 1000, 900, 800, 880, and 700, and VULCAN XC-72 (manufactured by Cabot Corporation), #3050B, #3150B, #3250B, #3750B, #3950B, #950, #650B, #970B, #850B, MA-600, MA-230, #4000, and #4010 (manufactured by Mitsubishi Chemical Co., Ltd.), and CONDUCTEX SC, RAVEN 8800, 8000, 7000, 5750, 5250, 3500, 2100, 2000, 1800, 1500, 1255, and 1250 (manufactured by Columbian Chemicals Company), and KETJENBLACK EC (manufactured by Akzo Nobel).

Carbon black may be subjected to a surface treatment with a dispersing agent or subjected to grafting with a resin, and used, and a portion of the surface of carbon black may also be converted into graphite, and used. Before being added to a coating, carbon blacks may be dispersed with a binder in advance. These carbon blacks may be used in an amount of not exceeding 50% by mass relative to the amount of the aforementioned inorganic powder, and within the range of the amount which does not exceed 40% relative to the total mass of the non-magnetic layer. These carbon blacks may be used alone or in combination. As for carbon blacks that can be used in the invention, reference can be made to "Carbon Black Handbook" (edited by Carbon Black Association of Japan), for example.

Further, in accordance with the purpose, organic powder may be added to the non-magnetic layer. Examples of the organic powder include acrylic styrene resin powder, benzoguanamine resin powder, melamine resin power, and phthalocyanine pigments. However, polyolefin resin powder, polyester resin powder, polyamide resin powder, polyimide resin powder, or polyethylene fluoride resin may also be used. Methods of preparing the organic powder disclosed in JP-A Nos. 62-18564 and 60-255827 can be used.

The thickness of the non-magnetic layer is preferably about 0.2 μm to about 5.0 μm, more preferably about 0.3 μm to about 3.0 μm, and still more preferably about 1.0 μm to about 2.5 μm.

If the non-magnetic layer is substantially non-magnetic, the non-magnetic layer exerts its effect. For example, the non-magnetic layer may contain a small amount of a magnetic substance (magnetic material) as impurities on purpose. The "substantially non-magnetic" non-magnetic layer stands for a non-magnetic layer whose residual magnetic flux density is about 0.01 T or less or whose coercivity is about 7.96 kA/m (100 Oe or less), and preferably the one which has neither residual magnetic flux density or nor coercivity.

A binder resin, a lubricant, a dispersing agent, an additive, a solvent, a dispersing method, or the like for the magnetic layer may also be used for the non-magnetic layer. In particular, any known technique for the magnetic layer may be applied to an amount and type of the binder resin or an addition amount and type of an additive or a dispersing agent.

An undercoat layer may be provided between the substrate and the non-magnetic layer or the magnetic layer in order to improve the adhesiveness therebetween. The thickness of the undercoat layer is preferably about 0.01 to about 0.5 μm, and more preferably from about 0.02 to about 0.5 μm.

(Back Layer)

The magnetic recording medium of the invention may be a disk-shaped medium comprising a substrate, and the non-magnetic layer and the magnetic layer on the both surfaces of the substrate, or a tape-shaped medium or disk-shaped medium having the non-magnetic layer or the magnetic layer on one surface of the substrate. In this case, a back layer may also be provided on the surface opposite to the surface of the substrate on which the non-magnetic layer or the magnetic layer is provided in order to exhibit an effect such as an antistatic effect and a curl-correcting effect. The thickness of the back layer is preferably about 0.1 to about 4 μm, and more preferably from about 0.3 to about 2.0 μm. Known materials can be used for the undercoat layer, and a back layer which will be described later.

Generally, as compared to video tapes or audio tapes, repetitive running performance is highly required for magnetic tapes for computer data recording. In order to keep such high running durability, it is preferable that the back layer contains carbon black and an inorganic powder.

It is preferable to use two types of carbon blacks having different average particle diameters in combination. In this case, it is preferable to use fine particulate carbon black having an average particle diameter of about 10 to about 20 nm and carbon black coarse particles having an average particle diameter of about 230 to about 300 nm, in combination.

Generally, due to the addition of the fine particulate carbon black, the surface electric resistance of the back layer can be set low, and the light transmittance can be set low. there are many magnetic recording devices which utilize the light transmittance of a tape i as a operational signal although it is dependent on the types of magnetic recording devices. Particularly in this case, the addition of the fine particulate carbon black becomes effective. Further, the fine particulate carbon black are generally excellent in the ability to maintain a liquid lubricant, and contribute to a reduction of the frictional coefficient when used in combination with a lubricant.

On the other hand, the coarse particulate carbon blacks having a volume average particle diameter of 230 to 300 nm function to serve as a solid lubricant, and also form micro projections on the surface of the back layer to reduce the contact area, and contribute to the reduction of frictional coefficient. However, when the coarse particulate carbon blacks are used alone, during a heavy running system, due to the sliding of a tape, the coarse particulate carbon blacks are easily fallen from the back layer, and has a disadvantage leading to a high error rate.

Specific examples of product names of the fine particulate carbon blacks include the following ones. Average particle diameters are indicated inside the parentheses. Namely, RAVEN 2000B (18 nm) and RAVEN 1500B (17 nm) (manufactured by Columbian Chemicals Company), BP 800 (17 nm) (manufactured by Cabot Corporation), PRINTEX 90 (14 nm), PRINTEX 95 (15 nm), PRINTEX 85 (16 nm), and PRINTEX 75 (17 nm) (manufactured by Degussa AG), and #3950 (16 nm) (manufactured by Mitsubishi Chemical Industries Ltd.). Further, specific examples of product names of the coarse particulate carbon blacks include Thermal Black (270 nm) (manufactured by Cancarb Ltd.) and RAVEN MTP (275 nm) (manufactured by Columbian Chemicals Company).

When two types of carbon blacks having different average particle diameters are used in the back layer, the content ratio (mass ratio) of the fine particulate carbon blacks having a volume average particle diameter of about 10 to about 20 nm to the coarse particulate carbon blacks having a volume average particle diameter of about 230 to about 300 nm, is preferably in a range of from 98:2 to 75:25, and more preferably in the range of from 95:5 to 85:15.

The content of the carbon black in the back layer (total amount when two types of carbon blacks are used) is generally in a range of about 30 to about 80 parts by mass, and preferably in a range of about 45 to about 65 parts by mass, with respect to 100 parts by mass of the binder.

It is preferable to use two types of inorganic powders having different hardnesses in combination. For example, it is preferable to use a soft inorganic powder with a Mohs' hardness of about 3 to about 4.5 and a hard inorganic powder with a Mohs' hardness of about 5 to about 9. When such a soft inorganic powder with a Mohs' hardness of about 3 to about 4.5 is added, the coefficient of friction can be stabilized to repeated running. In such a hardness range, a slide guide pole can also be prevented from being abraded. Such an inorganic powder preferably has an average particle diameter of about 30 to about 50 nm.

Examples of the soft inorganic powder with a Mohs' hardness of about 3 to about 4.5 include calcium sulfate, calcium carbonate, calcium silicate, barium sulfate, magnesium carbonate, zinc carbonate, and zinc oxide. One or more of these materials may be used alone or in combination.

The amount of the soft inorganic powder in the back layer is preferably in the range from about 10 to about 140 parts by mass, more preferably from about 35 to about 100 parts by mass, based on 100 parts by mass of the carbon black.

When the hard inorganic powder with a Mohs' hardness of about 5 to about 9 is added, the strength of the back layer can be increased so that the running durability can be improved. When such an inorganic powder is used in combination with the carbon black and the soft inorganic powder, a strong back layer can be formed to become less degraded by repeated sliding. When such an inorganic powder is added, an appropriate abrasive force can be imparted to the back layer so that the adhesion of shavings to a tape guide pole or the like can be reduced. Particularly, when the hard inorganic powder is used in combination with the soft inorganic powder, the sliding characteristics can be improved with respect to a surface guide pole having a rough surface, and the coefficient of friction of the back layer can also be stabilized.

The hard inorganic powder preferably has an average particle size in the range from about 80 to about 250 nm (more preferably from about 100 to about 210 nm).

Examples of the hard inorganic powder with a Mohs' hardness of about 5 to about 9 include α-iron oxide, α-alumina and chromium oxide ($Cr_2O_3$). One or more of these powdered materials may be used alone or in combination. In particular, α-iron oxide or α-alumina is preferred. The amount of the hard inorganic powder is generally from about 3 to about 30 parts by mass, preferably from about 3 to about 20 parts by mass, based on 100 parts by mass of the carbon black.

The soft and hard inorganic powders for use in combination in the back layer is preferably selected so as to have a difference of about 2 or more (more preferably of about 2.5 or more, particularly preferably of about 3 or more) in hardness.

The back layer preferably contains: the two types of the inorganic powders which are different in Mohs' hardness and each have a specific average particle size; and the two types of the carbon blacks different in average particle size.

The back layer may also contain a lubricant. Such a lubricant may be properly selected from the lubricants as described above for the non-magnetic layer or the magnetic layer. Based on 100 parts by mass of the binder, about 1 to about 5 parts by mass of the lubricant is generally added to the back layer.

(Protective Layer and the Like)

A very thin protective layer may be formed on the magnetic layer to improve the abrasion resistance. A lubricant may also be applied onto the protective layer to increase the sliding properties so that the resulting magnetic recording medium can have sufficient reliability.

Examples of the materials for the protective layer include oxides such as silica, alumina, titania, zirconia, cobalt oxide, and nickel oxide; nitrides such as titanium nitride, silicon nitride and boron nitride; carbides such as silicon carbide, chromium carbide and boron carbide; and carbon such as graphite and amorphous carbon. Particularly preferred is hard amorphous carbon generally called diamond-like carbon.

A protective carbon layer made of carbon can have sufficient resistance to abrasion even when very thin, so that it can hardly cause heat sticking to a slide member. Thus, the carbon is preferred material for the protective layer.

The protective carbon layer is generally formed by a sputtering method in the case of a hard disk. A number of methods using a high deposition rate plasma CVD technique are proposed for a product which has to be formed through a continuous layer formation, such as a video tape. Thus, any of these methods is preferably used.

Particularly, it is reported that a plasma injection CVD (PI-CVD) method can form a layer at a very high speed and can produce a hard protective carbon layer with less pinholes and with good quality (for example, see JP-A Nos. 61-130487, 63-279426 and 03-113824).

When a diamond-like carbon layer is used as the protective carbon layer, the structure thereof can be determined by the Raman spectroscopic analysis. Specifically, when the diamond-like carbon layer is used, it can be identified by the detection of a peak at a wave number of 1520 to 1560 $cm^{-1}$. As the structure of the carbon layer deviates from the diamond-like structure, the peak detected by the Raman spectroscopic analysis deviates from the above range, and the hardness of the protective layer also decreases.

Preferred carbon sources for use in forming the protective carbon layer include carbon-containing compounds such as alkanes such as methane, ethane, propane, and butane; alkenes such as ethylene and propylene; and alkynes such as acetylene. If desired, a carrier gas such as argon or an additive gas such as hydrogen and nitrogen for improving the layer quality, may be added.

If the protective carbon layer is too thick, the electromagnetic conversion characteristics can be deteriorated, or adhesiveness to the magnetic layer can be reduced. If the carbon layer is too thin, the abrasion resistance can be insufficient. Thus, the layer preferably has a thickness of about 2.5 to about 20 nm, more preferably of about 5 to about 10 nm.

In order to improve the adhesiveness between the protective layer and the magnetic layer as a substrate for the protective layer, it is preferred that the surface of the magnetic layer is etched with an inert gas or surface-modified by exposure to a reactive gas plasma such as oxygen plasma.

In order to improve the running durability and the corrosion resistance, it is preferred that a lubricant or an anti-corrosive agent is applied to the magnetic layer or the protective layer. The lubricant to be added may be a known hydrocarbon lubricant, a known fluoro-lubricant, a known extreme-pressure additive, or the like.

Examples of the hydrocarbon lubricant include carboxylic acids such as stearic acid and oleic acid; esters such as butyl stearate; sulfonic acids such as octadecyl sulfonic acid; phosphates such as monooctadecyl phosphate; alcohols such as stearyl alcohol and oleyl alcohol; carboxylic acid amides such as stearic acid amide; and amines such as stearylamine.

Examples of the fluoro-lubricant include lubricants in which part or the whole of the alkyl group of the hydrocarbon lubricants is substituted with a fluoroalkyl group or a perfluoropolyether group.

The perfluoropolyether group may be a perfluoromethylene oxide polymer, a perfluoroethylene oxide polymer, a perfluoro-n-propylene oxide polymer $(CF_2CF_2CF_2O)_n$, a perfluoroisopropylene oxide polymer $(CF(CF_3)CF_2O)_n$, or any copolymer thereof.

The hydrocarbon lubricant may have a polar functional group such as a hydroxyl group, an ester group and a carboxyl group at the end of the alkyl group or in its molecule. Such a compound is preferred because it can be highly effective in reducing the frictional force.

Its molecular weight may be from about 500 to about 5000, preferably from about 1000 to about 3000. If the molecular weight is from about 500 to about 5000, the volatilization can be suppressed, and a reduction in lubricity can also be suppressed. In addition, the increase in viscosity can be prevented, and accidental stop of running or head crushing can also be prevented, due to easy occurrence of adhesion of a disk to a slider.

For example, such a perfluoropolyether is commercially available under the trade name of FOMBLIN (trade name, manufactured by Ausimont) or KRYTOX (trade name, manufactured by DuPont).

Examples of the extreme-pressure additive include phosphates such as trilauryl phosphate, phosphites such as trilauryl phosphite, thiophosphates and thiophosphites such as trilauryl trithiophosphite, and a sulfur extreme-pressure agent such as dibenzyl disulfide.

One or more of these lubricants may be used alone or in combination. Any of these lubricants may be applied to the magnetic layer or the protective layer by applying a solution of the lubricant in an organic solvent by a wire-bar method, a gravure coat method, a spin coating method, a dip coating method, or the like, or by depositing the lubricant by a vacuum vapor deposition method.

Examples of the anti-corrosive agent include nitrogen-containing heterocyclic compounds such as benzotriazole, benzimidazole, purine, and pyrimidine, and derivatives thereof in which an alkyl side chain is introduced to the main ring; and nitrogen and sulfur-containing heterocyclic compounds such as benzothiazole, 2-mercaptobenzothiazole, tetrazaindene cyclic compounds, and thiouracil compounds, and derivatives thereof (Physical Characteristics)

The magnetic recording medium of the invention preferably has the physical characteristics as shown below.

In the magnetic recording medium of the invention, the magnetic layer preferably has a saturation magnetic flux density of about 0.1 to about 0.3 T and a coercivity of about 159 kA/m (2000 Oe) to about 796 kA/m (10000 Oe), more preferably of about 159 to about 239 kA/m (2000 to 3000 Oe). The distribution of the coercivity is preferably as narrow as possible. Its SFD is preferably about 0.6 or less.

In the case of a magnetic disk, the squareness ratio (two-dimensional random) is from about 0.55 to about 0.67, preferably from about 0.58 to about 0.64, and the squareness ratio (three-dimensional random) is preferably from about 0.45 to 0.55. In the case of vertical orientation, the squareness in the vertical direction is about 0.6 or more, preferably about 0.7 or more. When a dimagnetizing field correction is performed, it is about 0.7 or more, preferably about 0.8 or more in the vertical direction. In both two-dimensional random and three-dimensional random cases, the orientation ratio is preferably about 0.8 or more. In the two-dimensional random case, the squareness ratio Br or Hc in the vertical direction is preferably from about 0.1 to about 0.5 times that in the in-plane direction.

In the case of a magnetic tape, the squareness ratio is generally about 0.55 or more, preferably about 0.7 or more. The friction coefficient of the magnetic recording medium of the invention with respect to a head is about 0.5 or less, preferably about 0.3 or less, at a temperature of −10 to 40° C. and a humidity of 0% to 95%. The surface specific resistance is preferably from about $10^4$ to about $10^{12}$ ohms/sq with respect to the magnetic layer surface. The charging potential is preferably from about −500 V to about +500 V.

The elastic modulus of the magnetic layer at 0.5% elongation is preferably from about 100 to about 2000 kg/mm² (0.98 to 19.6 GPa) in each in-plane direction. The breaking strength is preferably from about 10 to about 70 kg/mm² (98 to 686 MPa). The elastic modulus of the magnetic recording medium is preferably from about 100 to about 1500 kg/mm² (0.98 to 14.7 GPa) in each in-plane direction. The residual elongation is preferably about 0.5% or less. The thermal contraction rate at any temperature equal to or lower than 100° C. is preferably about 1% or less, more preferably about 0.5% or less, still preferably about 0.1% or less. The glass transition temperature of the magnetic layer (the maximum point of the loss elastic modulus by dynamic visco-elastic measurement at 110 Hz) is preferably from about 50 to about 120° C. The glass transition temperature of the lower non-magnetic layer is preferably from about 0 to about 100° C.

The loss elastic modulus is preferably in the range from about $1 \times 10^9$ to about $8 \times 10^{10}$ μN/cm². The loss tangent is preferably about 0.2 or less. If the loss tangent is too large, adhesion failure can easily occur. These thermal characteristics or mechanical characteristics preferably remain within about 10% in each in-plane direction of the recording medium. The content of the residual solvent in the magnetic layer is preferably about 100 mg/m² or less, more preferably about 10 mg/m² or less. The porosity of the coating layer (with respect to both the non-magnetic layer and the magnetic layer) is preferably about 30% by volume or less, more preferably about 20% by volume or less. The porosity should preferably be small for high power, but in some cases, a certain value should be ensured depending on purpose. For example, in the case of a disk medium particularly for repeated use, a relatively high porosity may often be preferred for better running durability.

The center plane average surface roughness Ra of the magnetic layer should be 4.0 nm or less, preferably 3.8 nm or less, more preferably about 3.5 nm or less, with respect to a 250 μm×250 μm area measured with TOPO-3D manufactured by WYKO Corporation. Preferably, the magnetic layer is about 0.5 μm or less in maximum height Rmax, 0.3 μm or less in ten-point average roughness Rz, about 0.3 μm or less in center plane top height Rp, 0.3 μm or less in center plane valley depth Rv, from about 20% to about 80% in center plane area rate Sr, and from about 5 μm to about 300 μm in average wavelength λa. The surface projections of the magnetic layer are preferably provided as described above so that the electromagnetic conversion properties and the friction coefficient can be optimized. The projections can easily be controlled by filler control of the surface characteristics of the substrate, by the size and quantity of the powder added to the magnetic layer as described above, or by the shape of the surface of a calender roll. The curl is preferably within about ±3 mm.

EXAMPLES

Hereinafter, with reference to examples, the present invention is specifically explained. However, the present invention is not limited to this.

In the following description, it should be noted that "part(s)" stand for part(s) by mass.

Example 1

(Process of Preparing a Quenched Thin Band)

The following operations were conducted under an Ar atmosphere. First, after a fused alloy formed by fusing a starting material in an arc furnace was cooled, and placed in a silica tube. The alloy was fused at a high frequency, and pressure was applied thereto under an Ar gas atmosphere, the fused metal was blown onto a rotating copper roll from the silica tube through an orifice made of silica. The rotational speed of the roll was 20 m/s. As the starting material, alloy powder having a mass ratio of Nd:Fe:B=27:72:1 was used.

Accordingly, a quenched thin band (having a thickness of 10 μm) was obtained. The resultant quenched thin band was heated at the temperature of 500° C. so as to have a particle diameter of 25 nm. As a result, nanocrystals comprising monocrystals having a rare earth element-transition metal-metalloid described in Table 1 shown below was present, and a rare earth element-transition metal phase was present in the crystal particle interface.

(Removal of the Monocrystals Comprising a Rare Earth Element-Transition Metal-Metalloid from the Quenched thin Band)

The rare earth element-transition metal phase was dissolved and removed by immersing the quenched thin band in a 0.1 kmol/m³ of NaCl aqueous solution which was prepared by using a distilled water which was deoxidized by bubbling $N_2$. Thereafter, the quenched thin band washed with the deoxidized distilled water and NaCl was removed. Then, after dried, magnetic particles having a particle diameter of about 25 nm were obtained.

Example 2

(Formation of a Passive-State Layer)

The magnetic particles thus obtained in Example 1 was heated in air for 8 hours at the temperature of 60° C. to form an oxidized layer, i.e., a passive-state layer on the surface of the magnetic particles, to obtain a magnetic particle having the passive-state layer formed thereon. The thickness of the passive-state layer was determined by a transmission electron microscope, and had 5 nm.

Example 3

Magnetic particles were prepared in the same manner as that in Example 1 except that alloy powder having a mass ratio of Pr:Fe:B=26:72:1 was used as the material. The magnetic particle diameter was about 25 nm.

The composition and the magnetic characteristics of the resultant magnetic particles are described in Table 1 as shown below.

Further, the magnetic characteristic evaluation (measurement of coercivity) was made using a high sensitivity magnetization vector meter and a data processor manufactured by TOEI INDUSTRY CO., LTD. under condition of an applied magnetic field of 790 kA/m (10 kOe).

Comparative Example 1

In accordance with Example 1 disclosed in JP-A No. 2001-181754, particles (magnetic particles) comprising neodymium-iron-boron were prepared.

The obtained neodymium-iron-boron magnetic powder contains spherical particles having a particle diameter of 25 nm, and had Nd: 2.5 atomic %, Fe: 89 atomic %, B: 7.5 atomic % by a fluorescence X ray measurement (the content of neodymium in iron: 2.8 atomic %; the content of boron in iron: 8.4 atomic %). The saturated magnetization was 140 emu/g, and the coercive force was 2500 Oe.

The magnetic powder determined by an EDAX analysis using an FE-TEM was composed of Fe and $Nd_2Fe_{14}B$. The content of Nd in the composition is considerably smaller than the composition of $Nd_2Fe_{14}B$, and the composition is in the region where Fe and $Nd_2Fe_{14}B$ coexist in the equilibrium phase diagram of the neodymium-iron-boron system. The results were reasonable.

Comparative Example 2

The nanocrystals comprising monocrystals of a rare earth element-transition metal-metalloid obtained by heating the quenched thin band in Example 1 and a thin band comprising a rare earth element-transition metal phase at the crystal interface were mechanically pulverized, to obtain magnetic powder (magnetic body B) having a diameter of 1 μm.

TABLE 1

| | Composition of Magnetic particles | Crystal state | Coercive force (KA/m) | Saturation Magnetization (emu/g) |
|---|---|---|---|---|
| Example 1 | $Nd_2Fe_{14}B$ | monocrystal | 237 (3000Oe) | 170 |
| Example 2 | $Nd_2Fe_{14}B$ | monocrystal | 237 (3000Oe) | 180 |
| Example 3 | $Pr_2Fe_{14}B$ | monocrystal | 229.1 (2900Oe) | 170 |
| Comparative Example 1 | $Nd_2Fe_{14}B$ and Fe | polycrystal | 197.5 (2500Oe) | 140 |
| Comparative Example 2 | $Nd_2Fe_{14}B$ | polycrystal | 237 (3000Oe) | 150 |

[Preparation and Evaluation of the Magnetic Recording Medium]

The respective magnetic particles prepared in Examples 1 to 3 and Comparative Examples 1 and 2 were used and magnetic recording media according to Examples 1 to 3 and Comparative Examples 1 and 2 were prepared as follows:

(Preparation of Magnetic Liquid for Magnetic Layer)

The following materials were mixed to prepare a magnetic liquid for magnetic layer. Further, the following "magnetic bodies" were the respective magnetic particles prepared in Examples 1 to 3 and Comparative Examples 1 and 2.
"Magnetic bodies": 100 parts
"The following compound": 7.5 parts;
Compound which is hydroxyethylsulfonate sodium chloride adduct to a copolymer of vinyl chloride/vinyl acetate/glycidyl methacrylate/2-hydroxypropylallylether=86/5/5/4 ($SO_3Na=6\times10^{-5}$ eq/g, epoxy=$10^{-3}$ eq/g, and weight average molecular weight (Mw)=30,000)
"Polyurethane resin": 5 parts ($SO_3Na=7\times10^{-5}$ eq/g, containing an OH end group, Mw=40,000, polyesterpolyurethane at Tg 90° C.)
"Cyclohexanone": 60 parts
"Alumina abrasive material having a particle diameter of 0.1 μm": 1.5 parts
"Carbon black (particle size; 40 nm)": 2 parts
"Methylethyl ketone": 51 parts
"Toluene": 1200 parts
"Polyisocyanate ("CORONATE 3041" manufactured by NIPPON POLYURETHANE INDUSTRY CO., LTD.): 5 parts (solid part)
"Butylstearate": 5 parts
"Isohexadecylstearate": 5 parts
"Stearic acid": 1 part
"Oleic acid: 1 part (Preparation of Non-Magnetic Liquid for Non-Magnetic Layer)

The following materials were mixed to prepare a non-magnetic liquid for the non-magnetic layer.
"Titanium oxide": 85 parts
(Average particle diameter: 0.035 μm, crystal rutile, the content of $TiO_2$: 90% or more, surface treatment layer; alumina, SBET: 35 to 42 $m^2/g$, true specific gravity: 4.1, pH: 6.5 to 8.0)
"The following compound": 11 parts; Compound which is hydroxyethylsulfonate sodium chloride adduct to a copolymer of vinyl chloride/vinyl acetate/glycidyl methacrylate=86/9/5 ($SO_3Na=6\times10^{-5}$ eq/g, epoxy=$10^{-3}$ eq/g, and Mw=30,000)
"Sulfonic acid-containing polyurethane resin (UR8700 manufactured by TOYOBO CO., LTD.)": 10 parts (solid part)
"Cyclohexanone": 4260 parts
"Methylethyl ketone": 56 parts
"Butyl stearate": 5 parts
"Isohexadecyl stearate": 5 parts "Polyisocyanate ("CORONATE 3041" manufactured by NIPPON POLYURETHANE INDUSTRY CO., LTD.): 5 parts (solid matter)

"Stearic acid": 1 part

"Oleic acid: 1 part

The resultant non-magnetic coating liquid was coated on the surface of a polyethylene terephthalate substrate having a thickness of 62 μm to form a non-magnetic layer having a dry thickness of 1.5 μm and the magnetic recording layer having a dry thickness of 0.2 μm by a multilayer simultaneous coating.

The both layers before drying were passed through an alternating current magnetic field generator having two magnetic fields having a frequency of 50 Hz and a magnetic field strength of 250 Gauss, and a frequency: 50 Hz and a magnetic field strength of 120 Gauss, to subject the layers to a random orientation process. Further, after the both layers were dried, a calendar treatment with a combination of metal roll-metal roll-metal roll-metal roll-metal roll-metal-metal roll-metal roll was conducted under the conditions of speed: 100 m/min., linear load: 300 kg/cm, and temperature: 90° C. This was punched into a disk of 3.7 inches and was subjected to a surface polishing abrasion treatment. Thereafter, this was put into Zip-Disk cartridge manufactured by U.S. Iomega Inc. and predetermined structural components were added thereto to obtain a flexible disk.

The electromagnetic conversion characteristic of the resulting medium was evaluated by conducting recording and reproducing on the media at the 25-mm position of the medium radius using the ring head by using the Spin Stand LS90 manufactured by Kyodo Electronics. The write current was 10 mA. It was determined whether it was possible to evaluate the electromagnetic conversion characteristic of the recording medium at a rotating speed of 3000 rpm.

TABLE 2

|  | Outputs (relative values) |
|---|---|
| Example 1 | 100 |
| Example 2 | 100 |
| Example 3 | 95 |
| Comparative Example 1 | 50 |
| Comparative Example 2 | — |

The outputs in Table 2 were evaluated as relative values with respect to the output value in Example 1 as 100. The surface state of the sample obtained in Comparative Example 2 was visually bad thus making it impossible to evaluate electrical characteristics. It was considered that the electrical characteristics in Comparative Example 1 were low because magnetic particles are the one in which $Nd_2Fe_{14}B$ and Fe were coexistent.

The present invention can provide magnetic particles having excellent electro-magnetic conversion characteristics, a method of producing the same and a magnetic recording medium.

What is claimed is:

1. A method of producing magnetic particles, wherein the method comprises a process for forming a quenched thin band comprising a rare earth element-transition metal-metalloid by pouring a fused metal composed of a rare earth element-transition metal-metalloid onto a rotating roll, subjecting the quenched thin band to a thermal treatment at temperatures of about 400° C. to about 1000° C. to precipitate nanocrystals having a monocrystal state, and dissolving and removing an excess rare earth element-transition metal phase by immersing the quenched thin band in an aqueous sodium chloride solution or an aqueous sodium sulfate solution, after the quenched thin band has been formed, and separation of the nanocrystals.

2. The method of producing magnetic particles according to claim 1, wherein the process of quenching the fused metal is performed under an inert gas atmosphere.

3. The method of producing magnetic particles according to claim 1, wherein the method further comprises a step of forming a passive-state layer on the surface of the formed magnetic particles by heating particles at temperatures of about 40° C. to about 80° C. in the presence of oxygen.

* * * * *